United States Patent
Thomas (10) Patent No.: US 9,472,025 B2
(45) Date of Patent: Oct. 18, 2016

(54) COMPRESSIBLE EYECUP ASSEMBLIES IN A VIRTUAL REALITY HEADSET

(71) Applicant: Oculus VR, LLC, Menlo Park, CA (US)

(72) Inventor: Matt Lee Thomas, Buena Park, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 14/601,572

(22) Filed: Jan. 21, 2015

(65) Prior Publication Data

US 2016/0210782 A1    Jul. 21, 2016

(51) Int. Cl.
*G06T 19/00*     (2011.01)
*G02B 25/00*     (2006.01)
*G02B 27/01*     (2006.01)

(52) U.S. Cl.
CPC .......... *G06T 19/006* (2013.01); *G02B 25/001* (2013.01); *G02B 27/01* (2013.01); *G02B 27/017* (2013.01); *G02B 27/0172* (2013.01)

(58) Field of Classification Search
None
See application file for complete search history.

(56) References Cited

U.S. PATENT DOCUMENTS

| | | | | |
|---|---|---|---|---|
| 4,303,324 A * | 12/1981 | Marcus | ............... | H01L 41/0973 359/824 |
| 5,774,096 A * | 6/1998 | Usuki | ............... | G02B 7/12 340/980 |
| 5,815,126 A * | 9/1998 | Fan | ............... | G02B 27/017 345/7 |
| 5,986,816 A * | 11/1999 | Shikama | ............... | G02B 25/001 359/644 |
| 6,421,031 B1 * | 7/2002 | Ronzani | ............... | G02B 27/017 345/8 |
| 7,576,919 B2 * | 8/2009 | Durner | ............... | G02B 23/125 351/158 |
| 7,786,424 B2 * | 8/2010 | Durner | ............... | G02B 27/017 250/208.1 |
| 8,705,177 B1 * | 4/2014 | Miao | ............... | G09G 3/003 345/8 |
| 9,158,090 B2 * | 10/2015 | Hubert | ............... | G02B 7/04 |
| 2011/0241976 A1 * | 10/2011 | Boger | ............... | G02B 27/0172 345/8 |
| 2014/0168799 A1 * | 6/2014 | Hubert | ............... | G03B 3/10 359/824 |
| 2014/0266990 A1 * | 9/2014 | Makino | ............... | G02B 27/017 345/8 |
| 2015/0103306 A1 * | 4/2015 | Kaji | ............... | G02C 5/045 351/128 |
| 2015/0198807 A1 * | 7/2015 | Hirai | ............... | G02B 27/017 345/8 |
| 2015/0235426 A1 * | 8/2015 | Lyons | ............... | G02B 27/0172 345/8 |

(Continued)

FOREIGN PATENT DOCUMENTS

JP    2005-284066 A    10/2005
JP    2009-251420 A    10/2009

(Continued)

OTHER PUBLICATIONS

European Extended Search Report, European Application No. 15185281.1, Mar. 16, 2016, 9 pages.

(Continued)

*Primary Examiner* — King Poon
*Assistant Examiner* — Vincent Peren
(74) *Attorney, Agent, or Firm* — Fenwick & West LLP (57) ABSTRACT

A virtual reality (VR) headset includes an electronic display element, an optics block, and an adjustment mechanism. The electronic display element outputs image light. The optics block includes a cone and an additional cone coupled to a lens and an additional lens, respectively. Image light is directed to the lens and to the additional lens via the cone and additional cone, respectively. Each of the cones comprises an opaque material that is deformable to adjust a distance from a base portion of a cone to a top portion of a cone may be adjusted, via, compression, elongation, or both. An adjustment mechanism may receive input from a user and configured to adjust the distance one or more of the cone and the additional cone.

20 Claims, 4 Drawing Sheets

(56) References Cited

U.S. PATENT DOCUMENTS

| | | | |
|---|---|---|---|
| 2015/0253574 A1* | 9/2015 | Thurber | G02B 27/0172 359/630 |
| 2016/0011422 A1* | 1/2016 | Thurber | G02B 27/0172 345/8 |
| 2016/0011423 A1* | 1/2016 | Thurber | G02B 27/0172 345/8 |
| 2016/0011424 A1* | 1/2016 | Thurber | G02B 27/0176 345/8 |
| 2016/0011425 A1* | 1/2016 | Thurber | G02B 27/0176 345/8 |

FOREIGN PATENT DOCUMENTS

| | | |
|---|---|---|
| JP | 2012-074952 A | 4/2012 |
| WO | WO 95/10061 A1 | 4/1995 |

OTHER PUBLICATIONS

Brandtberg, H. et al., "Head-Mounted Displays," Ericsson Review No. 1 (Incl. On), Telefonaktiebolaget, L M Ericsson, Jan. 1997, pp. 41-48, vol. 74, No. 1.

Schreyer, H. et al., "Integrated Helmet System with Image Intensifier Tubes,".

Display Devices, Dempa Publications, Jan. 1994, pp. 98-105, vol. 15, No. 2.

\* cited by examiner

COMPRESSIBLE EYECUP ASSEMBLIES IN A VIRTUAL REALITY HEADSET

BACKGROUND

The present disclosure generally relates virtual reality headsets, and specifically relates to extendible eyecup assemblies in a virtual reality headset.

Virtual reality (VR) headsets include eyecup assemblies, which pass light from an electronic display to the eyes of a user. The distance from a portion of an eyecup assembly to a user's eye generally affects the comfort of the user when wearing the VR headset and may also affect the user's field of view of content displayed by the VR headset. Conventional VR headsets include multiple rigid eyecup assemblies having different sizes to accommodate multiple users.

When installed in a VR headset, a size of rigid eyecup assembly, when installed in the VR headset, results in a different fixed distance from a user's eye to a portion of the installed rigid eyecup (e.g., a rear portion of the rigid eyecup assembly), which affects comfort or field of view of the user. To use a VR headset, the user chooses a size of rigid eyecup assembly resulting in comfortable wear of the VR headset and a desired field of view. For example, a user wearing eyeglasses would likely select an eyecup assembly with a greater distance between a portion of the eyecup assembly and the user's eye than a different user who does not wear eyeglasses to comfortably accommodate the user's eyeglasses when using the VR headset. However, producing various sets of rigid eyecup assemblies for use in a VR headset increases production costs of a VR headset.

SUMMARY

A virtual reality (VR) headset includes an electronic display element and an optics block having two eyecup assemblies. Each eyecup assembly includes a lens and a cone, or other structure, coupled to the lens and coupled to a mounting surface of a rigid body of the VR headset. The cone comprises an opaque material (e.g., a material that is opaque to wavelengths of visible light) that is deformable to adjust (e.g., increase or decrease) a distance between a top portion of the cone and a base portion of the cone. In some embodiments, adjustment to the distance between the top portion of the cone and the base portion of the cone is made via an adjustment mechanism included in the VR headset. Adjusting the distance between the top and bottom positions of the cone allows a user to adjust spacing between the outer surfaces of the lenses in each eyecup assembly and the user's eyes to comfortably use the VR headset. In some embodiments, the adjustment mechanism also allows the user to adjust a center spacing distance between each of the eyecup assemblies so the center spacing distance corresponds to the user's interpupillary distance (i.e., a distance between the centers of the pupils for each of the user's eyes). Adjusting the center spacing distance allows a user to align the locations of the exit pupils of the VR headset with the locations of the user's eyes. These adjustments allow use of a single VR headset by different users having different characteristics (e.g., different interpupillary distances, do not wear eyeglasses, wear eyeglasses, etc.).

In some embodiments, an eyecup assembly includes one or more compression adjusters. A compression adjuster adjusts a distance between a point on a top portion of a cone within the eyecup assembly and a point on a bottom portion of the cone. For example, a compression adjuster is a mechanical device, an electrical device, or some combination thereof. In some embodiments, a compression adjuster is a spring configured to compress in response to application of an electric current to the spring.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
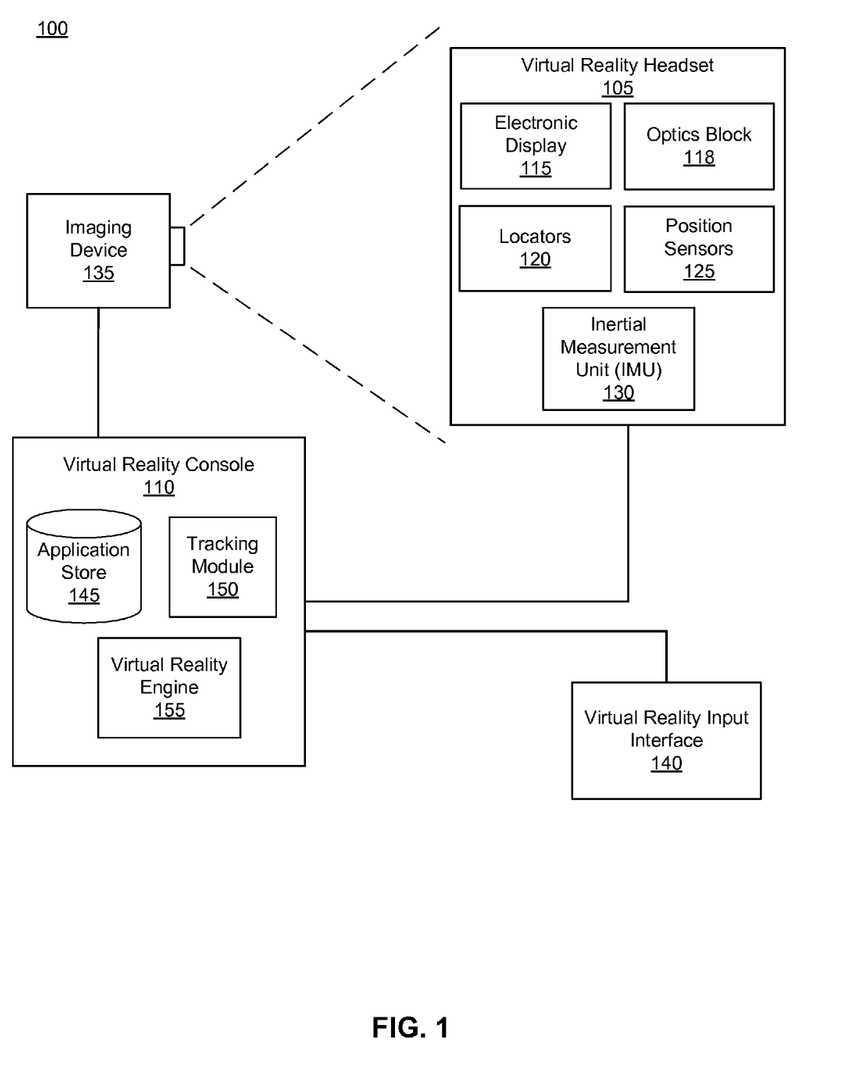
FIG. 1 is a block diagram of a system environment including a virtual reality (VR) system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system environment 100 including one VR headset 105, one imaging device 135, and one VR input interface 140, in other embodiments any number of these components may be included in the system environment 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received light, corrects optical errors associated with the image light, and presents the corrected image light to a user of the VR headset 105. In various embodiments, the optics block 118 includes one or more optical elements. Example optical elements included in the optics block 118 include: an aperture, a Fresnel lens, a convex lens, a concave lens, a filter, or any other suitable optical element that affects image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the content presented by the electronic display 115. For example, the field of view of the displayed content is such that the displayed content is presented using almost all (e.g., 110 degrees diagonal), and in some cases all, of the user's field of view. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The optics block 118 includes an eyecup assembly for each eye. Each eyecup assembly includes a lens and is configured to receive image light from the electronic display 115 and direct the image light to the lens, which directs the image light to a corresponding eye of a user wearing the VR headset 105. In some embodiments, one or more of the eyecup assemblies are deformable, so an eyecup assembly may be compressed or stretched to, respectively, increase or decrease the space between an eye of the user and a portion of the eyecup assembly, as further described below in conjunction with FIGS. 3-5B.

In some embodiments, the optics block 118 includes an adjustment mechanism, which is a mechanical or electrical device allowing a user to adjust a position of one or both of the eyecup assemblies with respect to the user's eyes. In some embodiments, the adjustment mechanism adjusts a spacing between an outer surface of each eyecup assembly and the user's eyes so the user is able to more comfortably use the VR headset 105. For example, a user not wearing eyeglasses positions the eyecup assemblies closer to their eyes than a user who wears eyeglasses via the adjustment mechanism. Additionally, in some embodiments, the adjustment mechanism enables the user to adjust a center spacing distance between each of the eyecup assemblies to correspond to the user's interpupillary distance (i.e., a distance between the centers of the pupils for each eye of the user). By adjusting the center spacing distance, a user is able to align the locations of the exit pupils of the VR headset 105 with the locations of the user's eyes. Accordingly, the adjustment mechanism allows a single VR headset 105 to be used by different users who have different interpupillary distances, who do not wear eyeglasses, who wear eyeglasses, or who have any other suitable characteristics.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), in some other portion of the electromagnetic spectrum, or in some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data indicating an estimated position of the VR headset 105 relative to an initial position of the VR headset 105 based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals generated by the one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals from various position sensors 125 and calculates the estimated position of the VR headset 105 from the sampled data. For example, the IMU 130 integrates the measurement signals received from one or more accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., for increasing signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or to end an application or to perform a particular action within the application. The VR input interface 140 may include one or more input devices. Example input devices include: a keyboard, a mouse, a game controller, a joystick, a yoke, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides content to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different components than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the VR headset 105 or the VR interface device 140. Examples of applications include: gaming applications, conferencing applications, video playback application, or other suitable applications.

The tracking module 150 calibrates the system environment 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. For example, the tracking module 150 determines positions of a reference point of the VR headset 105 using observed locators 120 from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof, of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
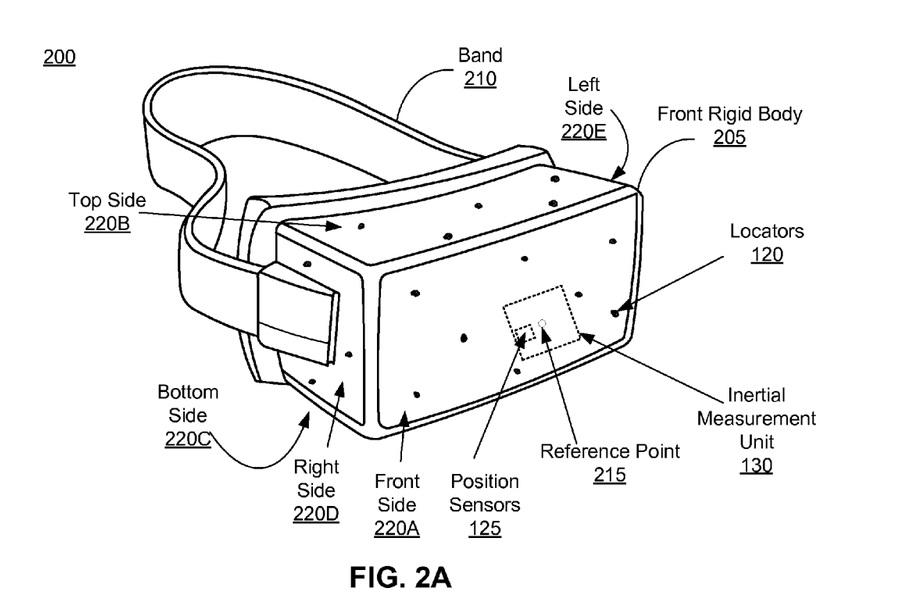
FIG. 2A is a wire diagram of a virtual reality headset, in accordance with an embodiment.

FIG. 2A is a wire diagram of a virtual reality (VR) headset 200, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
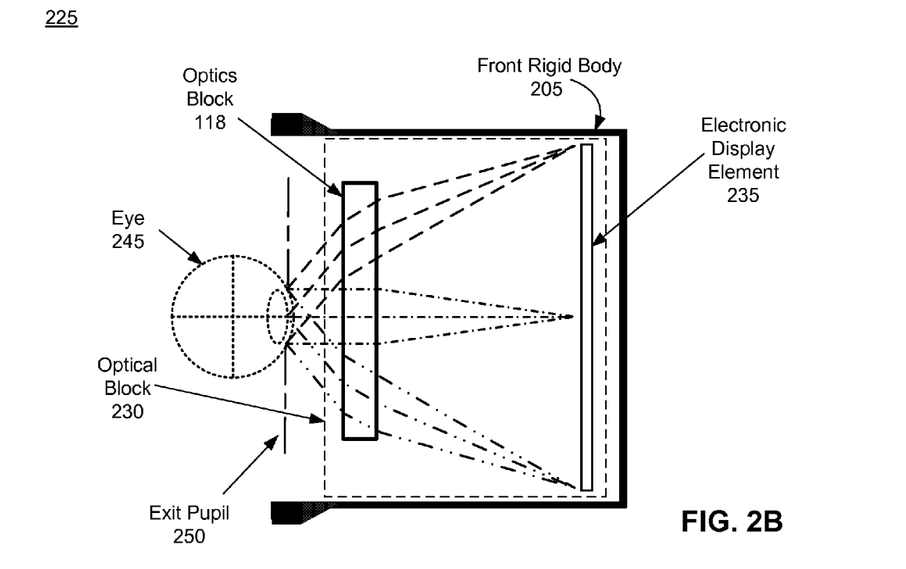
FIG. 2B is a cross section of a front rigid body of the VR headset in FIG. 2A, in accordance with an embodiment.

FIG. 2B is a cross section 225 of the front rigid body 205 of the embodiment of the VR headset 200 shown in FIG. 2A. As shown in FIG. 2B, the front rigid body 205 includes an optical block 230 that provides altered image light to an exit pupil 250. The exit pupil 250 is a location where a user's eye 245 is positioned while using the VR headset 200. For purposes of illustration, FIG. 2B shows a cross section 225 associated with a single eye 245, but another optical block, separate from the optical block 230, provides altered image light to another eye of the user.

The optical block 230 includes an electronic display element 235 of the electronic display 115, and the optics block 118. The electronic display element 235 emits image light toward the optics block 118. In some embodiments, the optics block 118 corrects for one or more optical errors (e.g., distortion, astigmatism, etc.) via one or more optical elements or other components. The optics block 118 directs, via an eyecup assembly, corrected image light to the exit pupil 250 for presentation to the user. In some embodiments, optical elements for correcting one or more optical errors included in the eyecup assembly.

Figure 3:
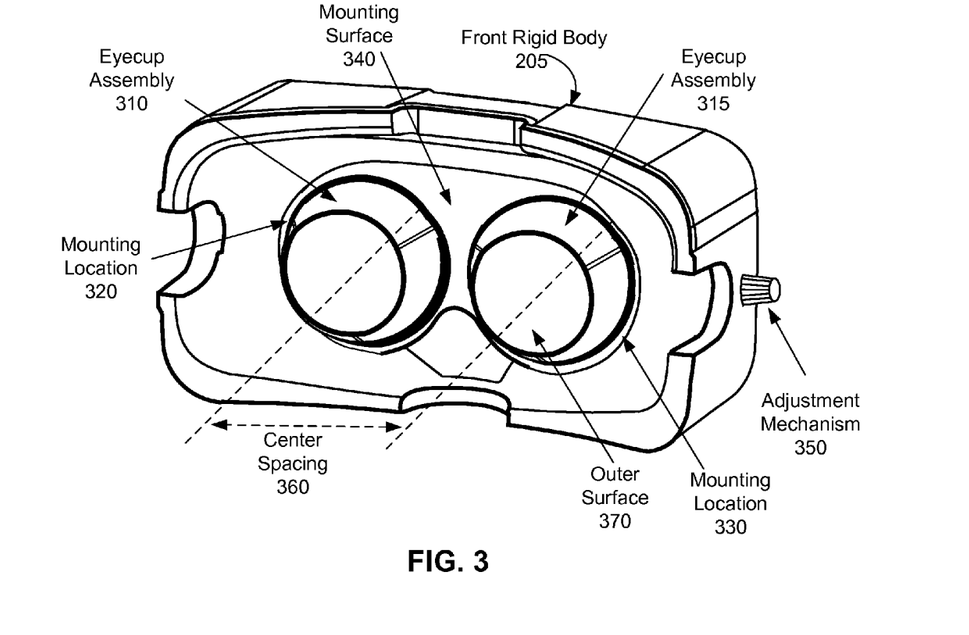
FIG. 3 is a wire diagram of an embodiment of the front rigid body of the VR headset shown in FIG. 2A, in accordance with an embodiment.

FIG. 3 is a wire diagram of an embodiment of the front rigid body 205 of the VR headset 200 shown in FIG. 2A. The front rigid body 205 includes eyecup assemblies 310 and 315 that are coupled to mounting locations 320 and 330, respectively, on a mounting surface 340. As discussed below in conjunction with FIG. 4, portions of the eyecup assemblies 310, 315 may be compressed, stretched, or otherwise deformed to adjust spacing between a user's eyes and outer surfaces 370 of the eyecup assemblies 310, 315. In some embodiments, an adjustment mechanism 350 modifies one or more of the eyecup assemblies 310, 315 to adjust the spacing between one or more of the user's eyes and outer surfaces 370 of one or more of the eyecup assemblies 310, 315. Alternatively, a user may manually adjust the spacing between the user's eyes and outer surfaces 370 of one or more of the eyecup assemblies by manually compressing or stretching an eyecup assembly 310, 315. Additionally, in some embodiments, the coupling of the eyecup assemblies 310, 315 to the mounting surface 340 allows adjustment of a center spacing 360 between centerlines of the eyecup assemblies 310, 315. This allows a user to adjust the center spacing 360 to correspond to the user's interpupillary distance (i.e., a distance between the centers of the pupils for each eye of the user).

Figure 4:
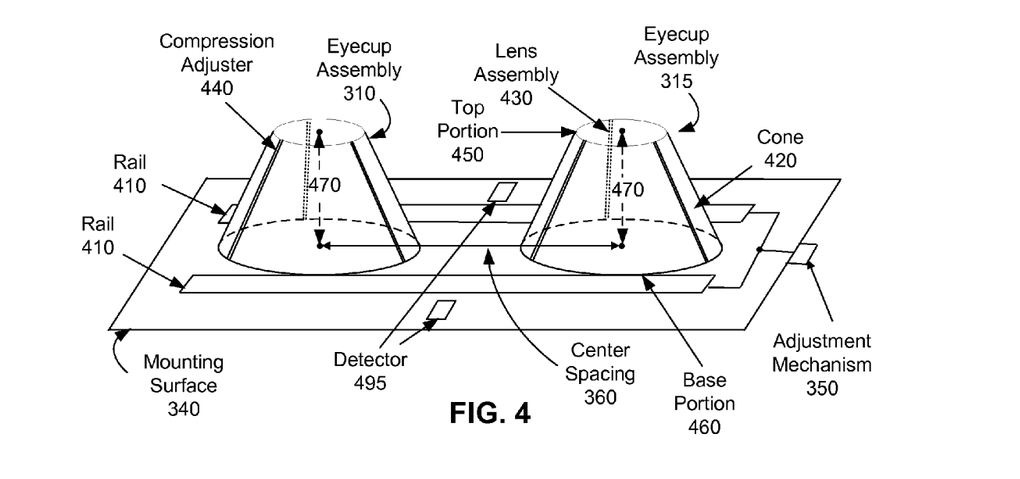
FIG. 4 is a wire diagram of an embodiment of two eyecup assemblies coupled to a mounting surface of the front rigid body shown in FIG. 3, in accordance with an embodiment.

FIG. 4 is a wire diagram of an embodiment of the two eyecup assemblies 310, 315 coupled to the mounting surface 340 of the front rigid body 205 shown in FIG. 3. As shown in FIG. 4, the eyecup assemblies 310, 315 are coupled to the mounting surface 340 to allow adjustment of the center spacing 360 between the eyecup assemblies 310, 315. In the example of FIG. 4, the mounting surface 340 includes rails 410 that are coupled to the eyecup assemblies 310, 315 and coupled to the adjustment mechanism 350. In some embodiments, the rails 410 are threaded and interface with a corresponding threading on one or both of the eyecup assemblies 310, 315. For example, as one or both rails 410 rotate in a direction, the eyecup assemblies 310, 315 move toward each other, while the eyecup assemblies 310, 315 move away from each other as one or both of the rails rotate in an opposite direction.

Each eyecup assembly 310, 315 includes a cone 420, a lens assembly 430, and one or more compression adjusters 440. The lens assembly 430 of an eyecup assembly 310, 315 includes one or more optical elements and is configured to direct portions of image light to a corresponding exit pupil 250 that corresponds to a location of an eye of a user of the VR headset 200. In some embodiments, the lens assembly 430 is also configured to correct one or more types of optical error and/or to magnify the image light.

A cone 420 includes a top portion 450 and a base portion 460. The top portion 450 is coupled to the lens assembly 430 and is configured to hold the lens assembly 430. The cone 420 is configured to receive image light through the base portion 460 and direct the image light toward the lens assembly 430. In various embodiments, the cone 420 is composed of a material that is opaque to visible light and is deformable, so a deformation distance 470 between the top portion 450 and the base portion 460 may be altered. For example, the cone 420 is made of thermoplastic polyurethane. In some embodiments, a user may manually compress or stretch the cone 420 to alter the deformation distance 470, and the cone 420 maintains the deformed state. In other embodiments, the deformation distance 470 may be adjusted using the adjustment mechanism 350 or other suitable mechanism.

Figure 5A:
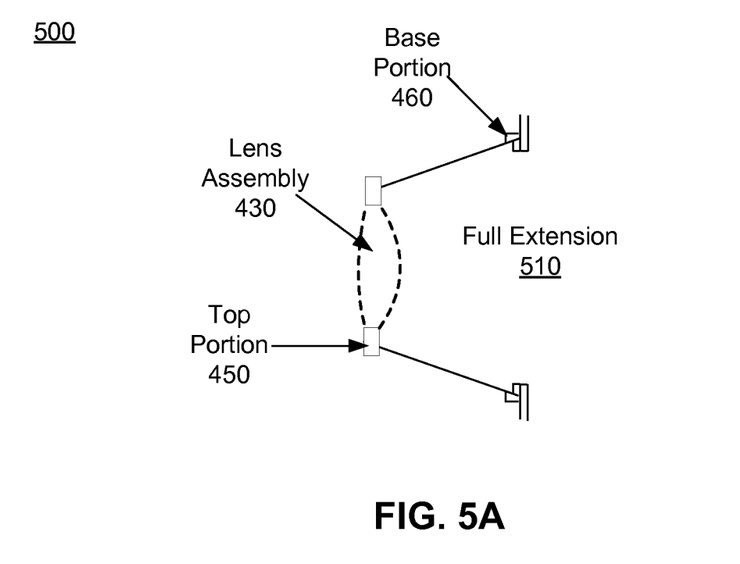
FIG. 5A is a cross section of an eyecup assembly in a full extension state, in accordance with an embodiment.
Figure 5B:
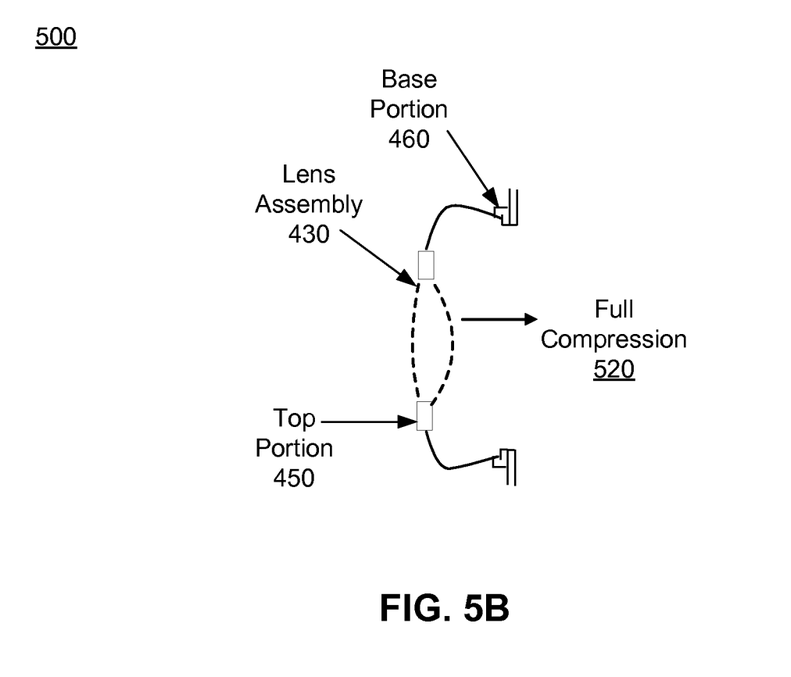
FIG. 5B is a cross section of the eyecup assembly in a full compression state, in accordance with an embodiment.

The cone 420 occupies various positional states corresponding to different distances between its top portion 450 and its bottom portion 460. Example positional states include a full extension state, a partial compression state, and a full compression state. The full extension state is a state of the cone 420 where a distance between the top portion 450 and the bottom portion 460 has a maximum value. The full compression state is a state of the cone 420 where the distance between the top portion 450 and the bottom portion 460 has a minimum value. The partial compression state is a state of the cone 420 where the distance between the top portion 450 and the bottom portion 460 has a value below the maximum value but greater than the minimum value. For example, FIG. 5A is a cross section of an embodiment of an eyecup assembly 500 in a full extension state 510. In contrast, FIG. 5B is a cross section of an embodiment of the eyecup assembly 500 in a full compression state 520.

Turning back to FIG. 4, a compression adjuster 440 adjusts the distance of a particular cone 420 between a point on the top portion 450 of the cone 420 and a point on the bottom portion 460 of the cone 520. Each cone 420 includes at least one compression adjuster 440. In the embodiment illustrated in FIG. 4, each cone 420 includes three compression adjusters 440. A compression adjuster 440 may be a mechanical device, an electrical device, or some combination thereof.

In some embodiments, a compression adjuster 440 is a spring that is electrically coupled to the adjustment mechanism 350, or another suitable device. The spring is composed of an electrically conductive material, where application of an electrical current to the spring causes the spring to compress. When electrical current is not provided to the spring, the spring does not compress. In various embodiments, the amount by which the spring compresses when current is applied positively correlates with the amount of current applied to the spring. Compression of a spring when current is applied occurs because the coils of the spring have currents flowing in the same direction, which products a magnetic field causing each loop of the spring to be attracted toward each other.

The adjustment mechanism 350 may be a mechanical and/or electrical adjustment device capable of causing one and/or both of the eyecup assemblies 310, 315 to deform. Deformation of an eyecup assembly 310, 315 alters a deformation distance 470 between a top portion 450 of the cone 420 of the eyecup assembly 310, 315 and a bottom portion 460 of the cone 420 of the eyecup assembly 310, 315. The adjustment mechanism 350 is mechanically and/or electrically coupled to the one or more compression adjusters 440. Responsive to receiving an input from the user, the adjustment device 350 causes one or more of the compression adjusters 440 to compress or to extend.

Additionally, in some embodiments, the adjustment mechanism 350 may cause one or both of the eyecup assemblies 310, 315 to move along the rails 410. For example, the adjustment mechanism 350 may interface (electrically and/or mechanically) with the rails 410 so an adjustment by the user via the adjustment mechanism 350 modifies the center spacing distance 360. In alternative embodiments, a different adjustment mechanism is used to adjust the center spacing distance 360 of the eyecup assemblies 310, 315.

The mounting surface 345 may also include one or more detectors 495 used to determine position information for the eyecup assemblies 310, 315. For example, during calibration the detectors 495 determine different positions of the rails 410 and the positions of the rails 410 are mapped to corresponding positions of the eyecup assemblies 310, 315. Thus, the VR headset 105 determines positions of the eyecup assemblies 310, 315 using the positions of the rails 410 determined from the detectors 495.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A virtual reality (VR) headset comprising:
    an electronic display element configured to output image light;
    an optics block configured to receive the image light, the optics block comprising:
        a lens and an additional lens each configured to direct portions of the image light to corresponding exit pupils that correspond to locations of eyes of a user of the VR headset;
        a cone including a base portion, a top portion, and a plurality of compression adjusters, the base portion coupled to a mounting surface of a rigid body of the VR headset and the top portion coupled to the lens, the plurality of compression adjusters coupled to the top portion and the base portion of the cone to adjust a distance between the top portion and the base portion, the cone configured to receive image light through the base portion and direct the image light toward the lens and the cone comprising an opaque material that is deformable to adjust the distance between the top portion and the base portion;
        an additional cone including an additional base portion, an additional top portion, and an additional plurality of compression adjusters, the additional base portion coupled to the mounting surface of the rigid body of the VR headset and the additional top portion coupled to the additional lens, the additional plurality of compression adjusters coupled to the top portion and the base portion of the additional cone to adjust a distance between the additional top portion and the additional base portion, the additional cone configured to receive image light through the additional base portion and direct the image light toward the additional lens, the additional cone comprising the opaque material that is deformable to adjust the distance between the additional top portion and the additional base portion; and
        an adjustment mechanism configured to adjust the distance between the top portion and the base portion of the cone or the distance between the additional top portion and the additional base portion of the additional cone based on a received input, the adjustment mechanism configured to individually adjust one or more of the plurality of compression adjusters and one or more of the additional plurality of compression adjusters.

2. The VR headset of claim 1, further comprising:
    at least one of the plurality of compression adjusters configured to reduce the distance between the top portion and the base portion in response to an input received from the adjustment mechanism.

3. The VR headset of claim 2, wherein the at least one of the plurality of compression adjusters is a spring that is configured to compress in response to receiving an electrical current.

4. The VR headset of claim 1, wherein the cone comprises thermoplastic polyurethane.

5. The VR headset of claim 1, further comprising:
    a rail coupled to the base portion and an additional rail coupled to the additional base portion, wherein the adjustment mechanism is configured to adjust a center spacing distance between a center of the base portion and a center of the additional base portion in response to receiving a center spacing adjustment input.

6. The VR headset of claim 1, wherein the opaque material is opaque to wavelengths of visible light.

7. A virtual reality (VR) headset comprising:
an electronic display element configured to output image light;
an optics block configured to receive the image light, the optics block comprising:
a lens configured to direct portions of the image light to a corresponding exit pupil that corresponds to a location of an eye of a user of the VR headset;
a cone including a base portion, a top portion, and a plurality of compression adjusters, the base portion coupled to a mounting surface of a rigid body of the VR headset and the top portion coupled to the lens, the plurality of compression adjusters coupled to the top portion and the base portion of the cone to adjust a distance between the top portion and the base portion, the cone configured to receive image light through the base portion and direct the image light toward the lens and the cone comprising an opaque material that is deformable to adjust a distance between the top portion and the base portion; and
an adjustment mechanism configured to adjust the distance between the top portion and the base portion of the cone based on a received input, the adjustment mechanism configured to individually adjust one or more of the plurality of compression adjusters.

8. The VR headset of claim 7, wherein the optics block further comprises:
an additional lens configured to direct portions of the image light to a corresponding exit pupil that corresponds to a location of another eye of the user of the VR headset;
an additional cone including an additional base portion, an additional top portion, and an additional plurality of compression adjusters, the additional base portion coupled to the mounting surface of the rigid body of the VR headset and the additional top portion coupled to the additional lens, the additional plurality of compression adjusters coupled to the top portion and the base portion of the additional cone to adjust a distance between the additional top portion and the additional base portion, the additional cone configured to receive image light through the additional base portion and direct the image light toward the additional lens, the additional cone comprising the opaque material that is deformable to adjust a distance between the additional top portion and the additional base portion; and
the adjustment mechanism is further configured to adjust the distance between the additional top portion and the additional base portion of the additional cone based on the received input, the adjustment mechanism configured to individually adjust one or more of the additional plurality of compression adjusters.

9. The VR headset of claim 8, further comprising:
a rail coupled to the base portion and an additional rail coupled to the additional base portion, wherein the adjustment mechanism is configured to adjust a center spacing distance between a center of the base portion and a center of the additional base portion in response to a center spacing adjustment input.

10. The VR headset of claim 7, further comprising:
at least one of the plurality of compression adjusters configured to reduce the distance between the top portion and the base portion in response to an input received from the adjustment mechanism.

11. The VR headset of claim 10, wherein the at least one of the plurality of compression adjusters is a spring that is configured to compress in response to receiving an electrical current.

12. The VR headset of claim 7, wherein the cone comprises thermoplastic polyurethane.

13. The VR headset of claim 7, wherein the opaque material is opaque to wavelengths of visible light.

14. A virtual reality (VR) headset comprising:
an electronic display element configured to output image light;
an optics block configured to receive the image light, the optics block comprising:
a lens configured to direct portions of the image light to a corresponding exit pupil that corresponds to a location of an eye of a user of the VR headset;
a cone including a base portion, a top portion, and a plurality of compression adjusters, the base portion coupled to a mounting surface of a rigid body of the VR headset and the top portion coupled to the lens, the plurality of compression adjusters coupled to the top portion and the base portion of the cone to adjust a distance between the top portion and the base portion, the cone configured to receive image light through the base portion and direct the image light toward the lens and the cone comprising an opaque material that is deformable to adjust a distance between the top portion and the base portion;
an adjustment mechanism configured to adjust the distance between the top portion and the base portion of the cone based on a received input, the adjustment mechanism configured to individually adjust one or more of the plurality of compression adjusters; and
at least one of the plurality of compression adjusters is configured to reduce the distance between the top portion and the base portion in response to the received input.

15. The VR headset of claim 14, wherein the at least one of the plurality of compression adjusters is a spring that is configured to compress in response receiving an electric current.

16. The VR headset of claim 15, wherein the electric current is received by the spring in response to the received input.

17. The VR headset of claim 14, wherein the optics block further comprises:
an additional lens configured to direct portions of the image light to a corresponding exit pupil that corresponds to a location of another eye of the user of the VR headset;
an additional cone including an additional base portion, an additional top portion, and an additional plurality of compression adjusters, the additional base portion coupled to the mounting surface of the rigid body of the VR headset and the additional top portion coupled to the additional lens, the additional plurality of compression adjusters coupled to the top portion and the base portion of the additional cone to adjust a distance between the additional top portion and the additional base portion, the additional cone configured to receive image light through the additional base portion and direct the image light toward the additional lens, the additional cone comprising the opaque material that is deformable to adjust a distance between the additional top portion and the additional base portion; and the adjustment mechanism is further configured to adjust the distance between the additional top portion and the additional base portion of the additional cone based on the received input, the adjustment mechanism configured to individually adjust one or more of the additional plurality of compression adjusters.

18. The VR headset of claim 14, further comprising:
a rail coupled to the base portion and an additional rail coupled to the additional base portion, wherein the adjustment mechanism is configured to adjust a center spacing distance between a center of the base portion and a center of the additional base portion in response to a center spacing adjustment input.

19. The VR headset of claim 14, wherein the cone comprises thermoplastic polyurethane.

20. The VR headset of claim 14, wherein the opaque material is opaque to wavelengths of visible light.

* * * * *